United States Patent
Calmer et al.

(10) Patent No.: US 11,054,049 B2
(45) Date of Patent: Jul. 6, 2021

(54) PRECISION FUEL METERING CHECK VALVE CARTRIDGE

(71) Applicant: Buescher Developments, LLC, Cleveland, OH (US)

(72) Inventors: Kevin S. Calmer, Medina, OH (US); Timothy P. Meyer, Rocky River, OH (US); Sree K. Menon, Highland Heights, OH (US)

(73) Assignee: BUESCHER DEVELOPMENTS, LLC, Cleveland, OH (US)

( * ) Notice: Subject to any disclaimer, the term of this patent is extended or adjusted under 35 U.S.C. 154(b) by 0 days.

(21) Appl. No.: 16/445,596

(22) Filed: Jun. 19, 2019

(65) Prior Publication Data

US 2020/0400243 A1    Dec. 24, 2020

(51) Int. Cl.
| | |
|---|---|
| *F16K 17/30* | (2006.01) |
| *F02M 63/00* | (2006.01) |
| *F16K 15/02* | (2006.01) |
| *F16K 31/56* | (2006.01) |
| *F16K 15/04* | (2006.01) |
| *F16K 15/06* | (2006.01) |

(52) U.S. Cl.
CPC ......... *F16K 17/30* (2013.01); *F02M 63/0054* (2013.01); *F02M 63/0063* (2013.01); *F02M 63/0075* (2013.01); *F16K 15/021* (2013.01); *F16K 15/044* (2013.01); *F16K 31/566* (2013.01); *F16K 15/063* (2013.01); *Y10T 137/7927* (2015.04)

(58) Field of Classification Search
CPC .... F16K 17/30; F16K 17/0406; F16K 15/044; F16K 15/021; F16K 31/566; F16K 15/063; F02M 63/0054; F02M 63/0063; F02M 63/0075; Y10T 137/7927
See application file for complete search history.

(56) References Cited

U.S. PATENT DOCUMENTS

| | | | | |
|---|---|---|---|---|
| 110,082 | A | * 12/1870 | Snyder | A62C 4/02 48/192 |
| 4,365,648 | A | * 12/1982 | Grothe | F16K 15/044 137/539 |
| 4,396,035 | A | * 8/1983 | Maples | F16K 15/044 137/539 |
| 4,675,003 | A | * 6/1987 | Hooven | A61M 27/006 137/539 |
| 5,183,075 | A | * 2/1993 | Stein | F02M 59/462 137/493.6 |
| 6,116,273 | A | 9/2000 | Tarr et al. | |

(Continued)

*Primary Examiner* — Jessica Cahill
*Assistant Examiner* — Patrick C Williams
(74) *Attorney, Agent, or Firm* — Tarolli, Sundheim, Covell & Tummino

(57) ABSTRACT

A check and flow metering cartridge valve having two flow restriction zones, each zone being disposed adjacent a respective end of a valve chamber containing a check valve member, the zones being serially encountered by flow through the valve, the restriction of the restriction zones together being a majority of the total flow restriction in the valve, each restriction zone producing at least 26% of a total restriction to flow through the valve, the restriction zones maintaining back pressure in the valve chamber when the check valve member is unseated thereby providing damping of the check valve member.

11 Claims, 2 Drawing Sheets

(56) References Cited

U.S. PATENT DOCUMENTS

| | | | |
|---|---|---|---|
| 6,293,259 B1 * | 9/2001 | Kilgore | F02M 69/462 |
| | | | 123/457 |
| 6,668,856 B2 * | 12/2003 | Warlick | F02M 63/0054 |
| | | | 137/533.17 |
| 6,910,494 B2 * | 6/2005 | Warsakis | F16B 4/004 |
| | | | 137/15.18 |
| 7,931,126 B2 * | 4/2011 | Croci | F16N 21/02 |
| | | | 184/105.3 |
| 9,556,963 B2 * | 1/2017 | Hartmann | F16K 15/044 |
| 2015/0101688 A1 * | 4/2015 | Giessauf | F02M 63/0054 |
| | | | 137/539 |

* cited by examiner

PRECISION FUEL METERING CHECK VALVE CARTRIDGE

BACKGROUND OF THE INVENTION

The invention relates to flow control check valves, sometimes called bi-stable check valves, for diesel engine unit injectors.

PRIOR ART

A type of cartridge valve to which the invention is directed is used in diesel engine unit injectors to determine the injection volume with a precision flow rate and to prevent reverse flow. U.S. Pat. No. 6,116,273 discloses forms of bi-stable check valves of the type to which the present invention is directed. The bi-stable check valves illustrated in this reference patent depend on fuel flow through small clearances that can be fouled by debris entering the valve. The parts forming the small clearances are subject to wear and a consequent and undesirable change in performance. In this prior art, flow is directed through the coils of a valve spring creating turbulence and increasing potential for cavitation in the spring chamber. A commercial version of the type of valve disclosed in the referenced patent is expensive and difficult to produce and is known to fail as a result of internal parts jamming.

Designs with narrow annular orifices around a valve head may require supplementary guiding to reduce extraneous motion of the head and erratic performance. The required machining is very precise and difficult to perform even at a high cost.

SUMMARY OF THE INVENTION

The invention provides a cartridge type metered flow bi-stable check valve for unit injectors. The inventive cartridge valve is characterized by successive flow restriction zones. In the disclosed embodiments, the restriction zones are on opposite sides of a valve ball or other valve element. Preferably, an upstream restriction zone is a primary restriction and provides substantially more than half of the total valve flow restriction while a downstream restriction zone provides substantially less than half of the total valve flow restriction and is termed a secondary restriction.

The inventive valve in its preferred forms uses a spherical valve ball that can be inexpensively manufactured to exacting shape. The ball seals against a seat machined or otherwise integrally formed in a cartridge body. The seat is at an end of a ball and spring chamber, also integrally formed in the cartridge body. A first flow restriction zone is situated upstream of the seat and a second flow restriction zone is situated downstream of the seat. A plug adjacent an end of the cartridge body remote from the seat can be associated with the second restriction zone.

The simple construction of the inventive cartridge valve reduces manufacturing costs, produces reliable operation and extends valves service life.

DESCRIPTION OF THE PREFERRED EMBODIMENTS

Figure 1:
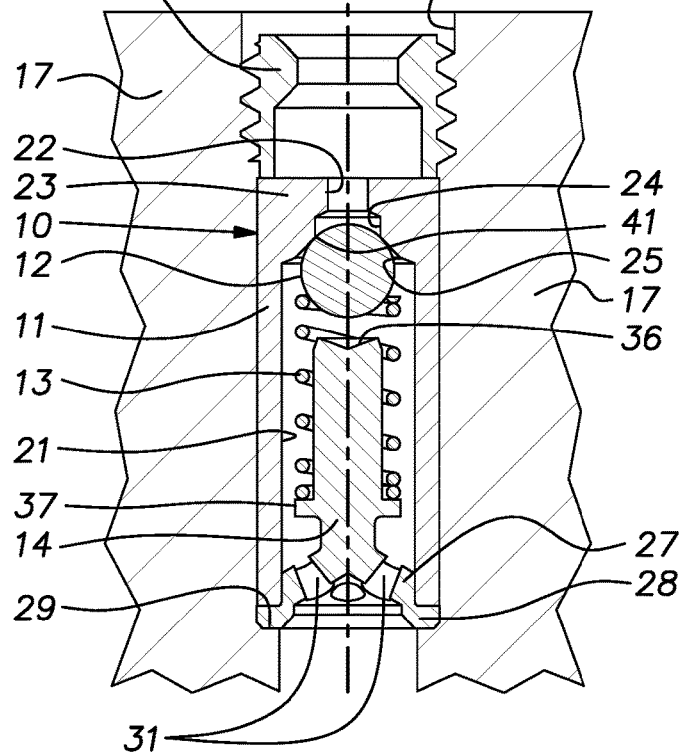
FIG. 1 is a longitudinal cross-sectional view of a preferred cartridge valve assembly embodying the invention.

FIG. 1 illustrates a first version of a preferred cartridge assembly 10 embodying the invention. The cartridge assembly 10 includes a housing body 11 that receives a spherical valve ball 12, a coil spring 13, and a stop plug 14. Unless otherwise noted or self-evident, the surfaces of the various elements are generally circular and symmetrical about a longitudinal axis 15. Flow through the assembly 10 is downward in the orientation shown in FIG. 1.

The cartridge assembly 10 is typically received in the metering circuit of a unit injector. An example of a circuit is somewhat diagrammatically represented in the unit injector disclosed in aforementioned U.S. Pat. No. 6,116,273, the disclosure of which is incorporated herein by reference. The cartridge assembly 10 is retained in a body or spacer, represented at 17, forming part of a unit injector assembly, by an externally threaded apertured nut 18, known in the art. The housing body 11 has a central longitudinally extending bore or chamber 21 in which is received the ball 12, spring 13, and stop or plug 14.

At an upper end, the housing body 11 has a primary flow restriction zone shown formed by a central circular orifice 22 through an end wall 23. The orifice 22 opens into an enlarged generally cylindrical bore 24 which, in turn, leads to a larger conical bore 25. The conical bore 25 opens into the main bore or chamber 21.

The plug 14 is centered on the axis 15 by a light press fit of an integral flange 27 in an open end of the housing body bore 21. Ideally, the flange 27 has an outer peripheral portion 28 that abuts an end face of the housing body 11. The peripheral portion 28, when the nut 18 is tightened, seals as a gasket against a shoulder 29 of the body 17 and holds the plug 14 straight along the axis 15. A radially inner part of the plug flange 27 presents a secondary flow restriction zone comprising, for example, a plurality of five equally spaced apertures 31 through which fuel is exhausted.

An upper end of the plug 14 has a central recess or pocket 36 to receive the ball 12 when the valve 10 is open. The concave geometry of the recess 36 serves to bias the ball so that it is centered on the axis 15 when in contact with the plug 14. The spring 13, which is in the form of a helical compression spring with open coils, has an inside diameter slightly greater than the outside diameter of the plug 14. The spring 13, at one end, abuts a shoulder 37 integrally formed on the exterior of the plug 14. The spring 13 resiliently biases the ball 12 towards a seat area 41 at or immediately adjacent the intersection of the conical bore 25 with the enlarged bore 24. The ball 12 and seat 41 have contacting surface areas that, when engaged, prevent essentially all fluid flow out of the chamber 21 through the orifice 22.

The spring 13 is proportioned, in relation to other valve componentry, to hold the ball 12 closed against the seat 41 until a cracking pressure of, for example, 25 psi exists at the aperture or orifice 22. At or above this pressure, flow through the cartridge valve assembly 10 occurs in a downward direction in the illustrated orientation of the assembly. The ball 12 below the cracking pressure rests in a stable position on the seat 41.

Ordinarily, fuel during a fuel metering cycle in the fuel passage designated 40 in the unit injector part body 17 will be in the range of 100 to 500 psi and in general may be at about 300 psi. The flow of fuel developed by this pressure through the aperture or orifice 22 forces the valve ball 12 from the seat 41 to the plug recess or pocket 36 where it rests in a second stable position while metered fuel flow established by the restrictions in the cartridge assembly 10 is sustained.

Flow through the aperture 22 passes through the successively larger passages of the bores 24, 25 and over the centrally held ball 12. It will be seen that liquid flow, i.e. diesel fuel, need not pass through coils of the spring 13 but, rather, for the most part, passes outside of the spring. Flow through the spring 13 could lead to cavitation wear of the coils which could lead to the formation of debris and/or premature failure. The liquid fuel passes out of the chamber 21 through the secondary flow restriction zone formed collectively by the individual holes or apertures 31 in the plug flange 27.

A primary function of the cartridge valve assembly 10 is to precisely meter the rate of fuel passing through the unit injector passage 40, during a metering cycle.

In accordance with the invention, the flow restriction provided by the cartridge valve assembly 10 is the combined effect of the primary flow restriction zone, represented by the single hole or orifice 22 and the secondary flow restriction zone represented collectively by the several apertures (e.g. 5) or circular holes 31. It can be demonstrated that the serial restriction zones produce a system or total valve restriction that is not directly numerically additive. Preferably, the primary flow restriction zone will be in the range 84 to 99% of the total value of valve flow restriction, and the secondary restriction zone will be in the range of 26 to 40% of the total valve flow restriction. By way of example but not limitation, the primary restriction zone can represent an aperture area of 0.00175 square inches and the secondary flow restriction zone can have a total orifice or aperture area of 0.00598 square inches (thereby being 3.417 times larger than the primary restriction zone.

The provision of two physically separate flow restriction zones in the cartridge assembly 10, between which the valve ball and spring are situated, is beneficial. Rapid and extraneous motions of the ball and/or spring are damped by a small pressure maintained in the chamber 21 between the primary and secondary restriction zones thereby improving valve operation and service life. The restriction effect of the two short orifice zones is less susceptible to temperature change of the fuel as compared to a long narrow annular orifice, for example. The chamber 21 between the flow restriction orifice zones stabilizes flow for more stable check valve operation without significant influence of temperature fluctuations. The risk of debris being lodged in the flow restriction zones is reduced by the disclosed relatively large openings, measured in transverse directions. The serial arrangement of spaced aperture zones allows larger size apertures compared to a system with a single aperture and the same flow restriction value.

The ball valve member 12 is free to rotate incrementally and thereby distribute any wear across its full surface. The cone opening 25 tends to center the ball to the seat 41.

In the below discussed alternative cartridge valve assemblies, parts having the same or essentially the same function as those described above are designated with the same number. Parts analogous to those disclosed above are designated with the same number preceded with the numeral 1, 2 or 3.

Figure 2:
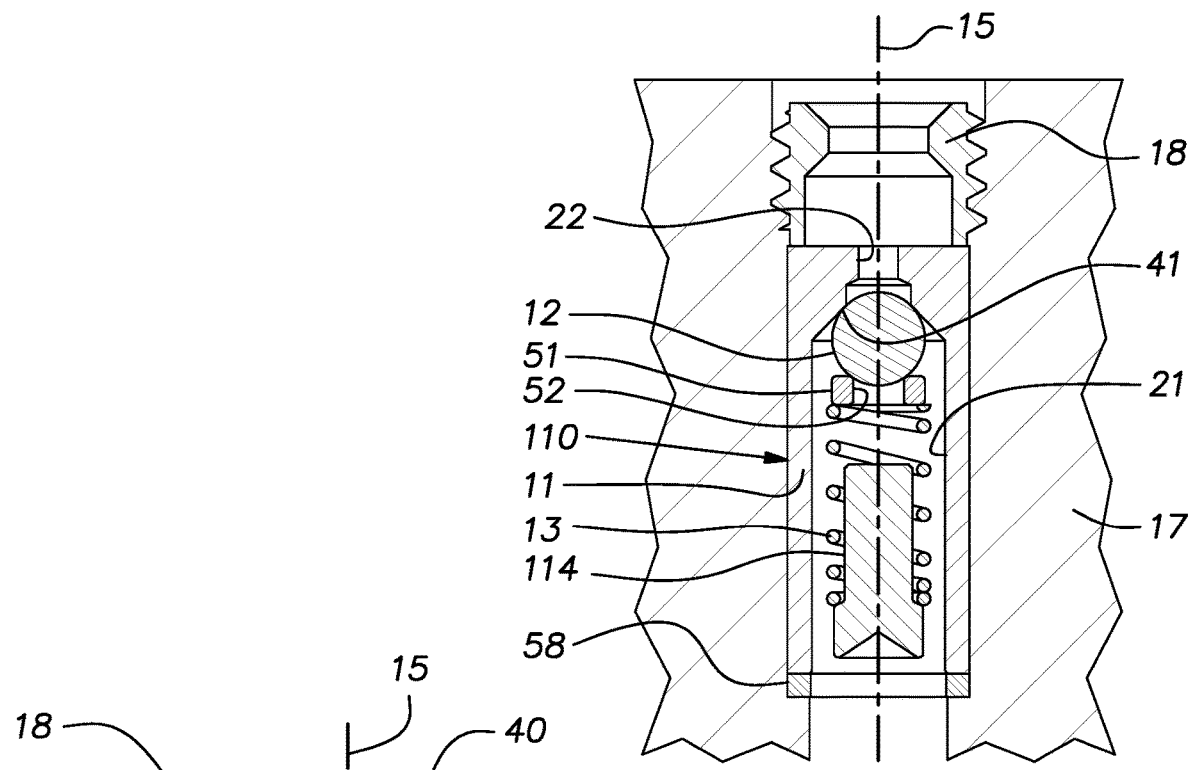
FIG. 2 is a longitudinal cross-sectional view of a variation of the inventive cartridge valve assembly.
Figure 2A:
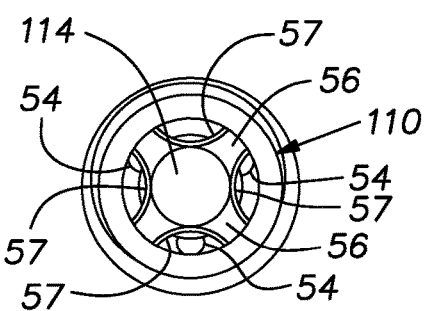
FIG. 2A is an end view of the assembly of FIG. 2.

In the embodiment of FIG. 2, a cartridge valve assembly 110 has a spider guide 51 between the spring 13 and ball 12. The guide 51 has a central aperture or pocket 52 to receive a portion of the ball 12 to thereby laterally or centrally locate the ball in the bore 21. The peripheries of the guide 51 has spaced radially extending legs 54 that slide freely along the wall of the bore or chamber 21. The guide 51 serves to maintain the ball 12 centered on the axis 15 as it moves from the seat 41 to the plug 114. Spaces between the legs 54 accommodate fuel flow through the chamber 21 when the ball 12 is off the seat 41. Axial displacement of the ball 12 from the seat 41 is limited by abutment of the spider guide 51 with the plug 114. A lower end of the plug 114 has peripheral arcuately spaced flutes 56 (See FIG. 2A). Orifices 57 between the flutes 56 provide a secondary flow restriction zone at the flow exit of the assembly 110. The flutes 56, which can be four in number, are dimensioned to provide a press fit in the chamber 21. An end of the spring 13 is supported against the flutes 56. The axial location of the plug 114 can be selected to adjust the spring force on the ball 12 and, consequently, the cracking pressure. The selected position of the plug 114 is maintained by its press fit in the chamber 21. An annular washer-like gasket 58 seals the assembly 110 to the receiving body 17 of a unit injector.

Figure 3:
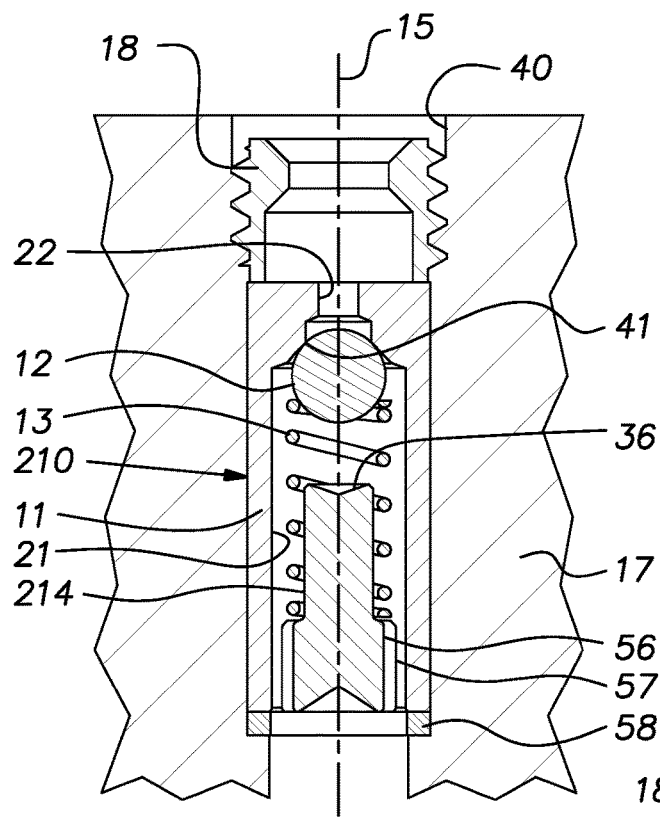
FIG. 3 is a longitudinal cross-sectional view of another variation of the inventive cartridge valve assembly.
Figure 3A:
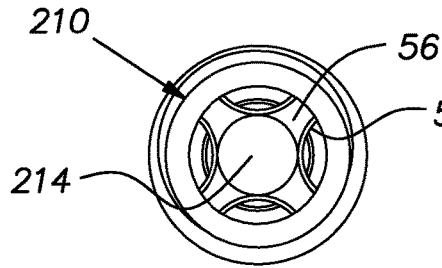
FIG. 3A is an end view of the cartridge of FIG. 3.

FIG. 3 illustrates a cartridge valve assembly 210 similar to the cartridge valve assembly 110 of FIG. 2. The assembly 210 differs from that of FIG. 2 essentially by omitting the spider guide. In this version, the ball 12 is stopped directly on a plug 214.

Figure 4:
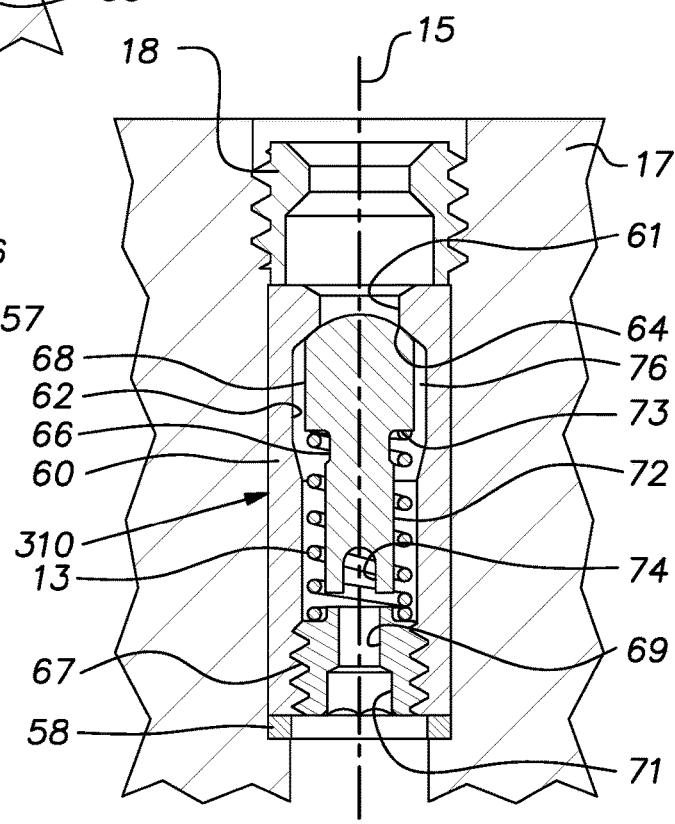
FIG. 4 is a longitudinal cross-sectional view of still another form of the inventive cartridge valve assembly of the invention.

Referring to FIG. 4, there is shown another version of a flow metering bi-stable check valve cartridge assembly 310. A generally cylindrical housing body 60 has an inlet passage 61 leading to a stepped circular bore 62. A valve seat 64 is formed immediately adjacent the intersection of the inlet passage 61 with the bore 62. The bore 62 receives a valve plunger 66, spring 13, and plug 67. A spherical end of a head 68 of the plunger 66 seals against the seat 64.

The plug 67, threaded into an end of the housing body 60 has a central aperture 69 leading to a hex or other acircular form of socket hole 71.

The spring 13 is assembled over a stem 72 of the plunger 66 and abuts a shoulder 73 of the plunger head 68. The opposite end of the spring 13 rests on a stepped face of the plug 67. The axial position of the plug 67 in the housing body 60 can be adjusted by turning it in the threads of the bore 62 thereby adjusting the closing force of the spring 13 on the plunger 66.

An end of the stem 72 distal from the head 68 has a transverse slot 74 open on opposite sides of the stem.

When fuel under sufficient pressure is applied to the inlet passage 61, the valve plunger 66 lifts off the seat 64 and engages the plug 67. Fuel flows along the plunger stem 72 and then passes through the central plug orifice or aperture 69, which serves as a primary flow restriction zone, and thereafter exits the cartridge valve assembly 310 through the acircular hole 71. An annular clearance space or orifice 76 between the plunger head 68 and the chamber bore 62 restricts flow and serves as a secondary flow restriction zone.

The various disclosed flow metering and check valve cartridge assemblies of the invention are characterized by two flow restriction zones each disposed at or near opposite ends of a valve chamber and serially encountered by liquid flow through the valve. The combined restriction of the restriction zones represents the majority of the flow restriction afforded by a valve assembly, each restriction zone producing at least 26% of the total restriction produced by the valve assembly.

The equivalent or total orifice size of the primary flow restriction zone can be proportioned to restrict flow to slightly more than the desired flow rate and the secondary flow restriction zone can be sized to adjust or fine tune the final flow through the subject valve design to that desired.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A diesel engine unit injector, comprising:
    a unit injector part body including a cartridge valve bore;
    a cartridge valve, including
        a valve chamber having longitudinally separated intake and outflow chamber ends in fluid communication via a chamber interior, the valve chamber including an orifice extending completely through an intake end wall to place the chamber interior in fluid communication with a space adjacent the intake chamber end, the orifice having a first cross-sectional area, and the valve chamber including a main bore extending through an outflow end wall to place the chamber in fluid communication with a space adjacent to the outflow chamber end, the main bore having a second cross-sectional area which is larger than the first cross-sectional area, and a seat area provided at a transition area longitudinally between the orifice and the main bore,
        a valve ball located within the chamber interior at a downstream position from the orifice, the valve ball being configured to selectively seal against the seat area to prevent fluid flow from entering the main bore when fluid pressure at the intake chamber end is below a predetermined cracking pressure,
        a plug located at least partially within the chamber interior and including longitudinally spaced upper and lower plug ends separated by a plug body, the upper plug end being located longitudinally adjacent, and downstream from, the valve ball and the lower plug end being located proximate the outflow chamber end, and
        a coil spring located within the chamber interior and being configured to bias the valve ball in an upstream direction toward the seat area and longitudinally away from the upper plug end, in a stable closed position, until fluid pressure at the intake chamber end reaches a magnitude greater than or equal to the predetermined cracking pressure, the coil spring laterally enclosing at least a portion of the plug body within the chamber interior,
        wherein, responsive to fluid pressure at the intake chamber end reaching the predetermined cracking pressure, the valve ball moves longitudinally in the downstream direction and into contact with the upper plug end to achieve a stable open position in which fluid is permitted to flow longitudinally past the valve ball and past at least a portion of the plug body within the chamber interior, the fluid egressing the chamber interior through the outflow chamber end; and
        an apertured nut configured to maintain the cartridge valve within the cartridge valve bore, the apertured nut including a longitudinally extending nut bore extending entirely therethrough to place the chamber interior of the cartridge valve in fluid communication with a fuel supply within the body of the unit injector.

2. The diesel engine unit injector of claim 1, including a housing body forming the valve chamber, the housing body being longitudinally bounded by the intake end wall and the outflow end wall, oppositely facing from the intake end wall.

3. The diesel engine unit injector of claim 1, further comprising two flow restriction zones defined within the chamber interior, wherein one of the flow restriction zones is disposed adjacent the intake chamber end, another of the flow restriction zones is disposed adjacent the outflow chamber end, the flow restriction zones are serially encountered by fluid flowing in the downstream direction through the valve, and the flow restriction zones are spaced apart within the chamber interior.

4. The diesel engine unit injector of claim 1, wherein the transition area of the chamber interior includes a conical bore interposed longitudinally between, and in fluid communication with both of, the orifice and the main bore, the seat area being located proximate an intersection of the conical bore and the main bore.

5. The diesel engine unit injector of claim 1, wherein the coil spring is located laterally proximate a portion of the plug body within the chamber interior such that fluid flow laterally between the coil spring and the plug body is at least partially avoided.

6. The diesel engine unit injector of claim 1, wherein the upper plug end includes a central recess for selectively receiving and centering the valve ball when the valve ball is in the stable open position.

7. The diesel engine unit injector of claim 1, wherein the lower plug end includes a flange extending laterally and longitudinally from the plug body to at least partially occupy a space radially between the plug body and an inward-facing wall of the chamber interior, the flange including a plurality of flange apertures extending therethrough to permit fluid flow through the chamber and egressing from the outflow chamber end.

8. The diesel engine unit injector of claim 7, wherein the flange protrudes from the outflow chamber end with an upstream-facing surface of the flange in contact with the outflow end wall.

9. The diesel engine unit injector of claim 7, wherein the plurality of flange apertures comprises a flow restriction zone.

10. The diesel engine unit injector of claim 1, wherein a laterally extending shoulder is formed on the plug body, a lower spring end of the coil spring is located on an upstream side of the shoulder, and the coil spring pushes longitudinally down on the shoulder when biasing the valve ball toward the seat area.

11. The diesel engine unit injector of claim 1, further comprising two flow restriction zones defined within the chamber interior, wherein one of the flow restriction zones is disposed adjacent the intake chamber end, another of the flow restriction zones is disposed adjacent the outflow chamber end, the flow restriction zones are serially encountered by fluid flowing in the downstream direction through the valve, and the flow restriction zones collectively maintain backpressure in the chamber interior when the valve ball is in the stable open position, thereby providing a damping function to at least one of the valve ball and coil spring.

* * * * *